No. 769,945. PATENTED SEPT. 13, 1904.
C. W. HOWLAND.
MACHINE FOR TRUING ROTARY GRINDSTONES.
APPLICATION FILED NOV. 18, 1902.
NO MODEL.
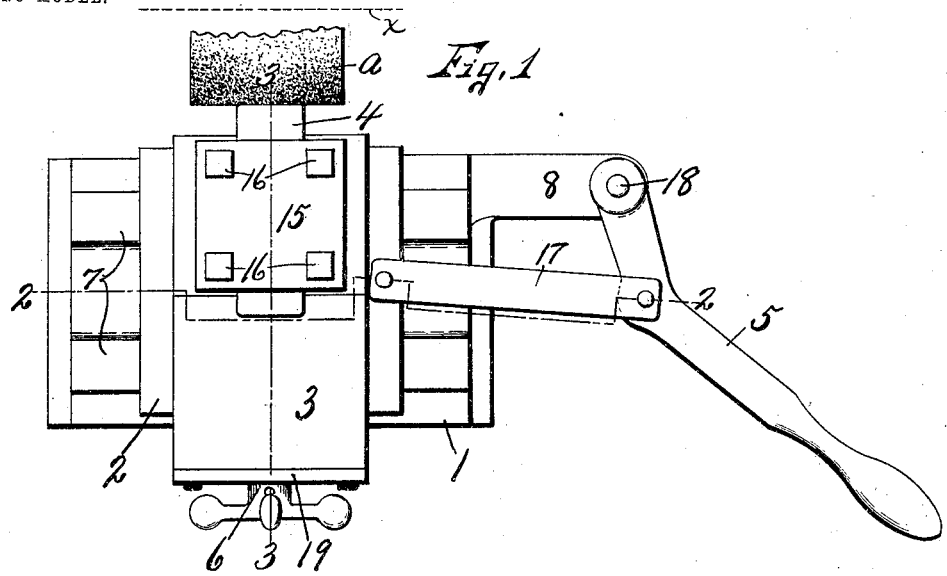
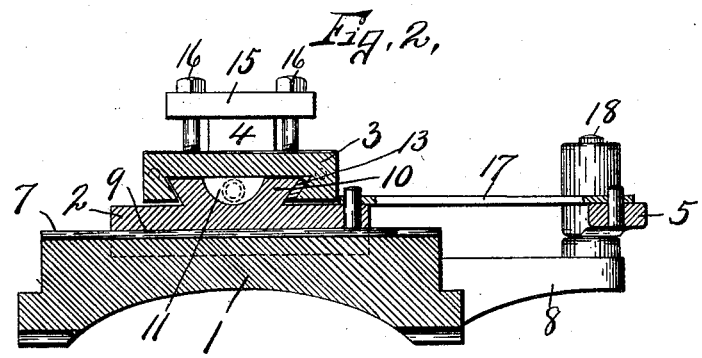
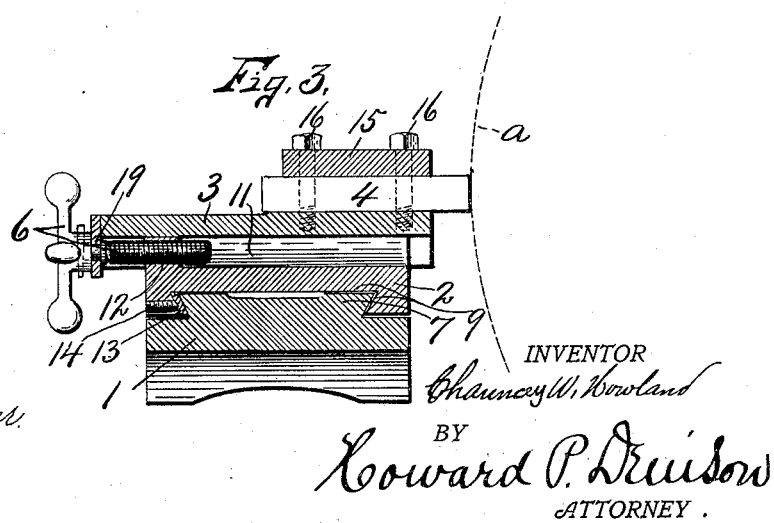
WITNESSES:
INVENTOR
Chauncey W. Howland
BY
Howard P. Denison
ATTORNEY.

No. 769,945.

Patented September 13, 1904.

UNITED STATES PATENT OFFICE.

CHAUNCEY W. HOWLAND, OF GENEVA, NEW YORK, ASSIGNOR TO THE STANDARD OPTICAL COMPANY, OF GENEVA, NEW YORK, A CORPORATION OF NEW YORK.

MACHINE FOR TRUING ROTARY GRINDSTONES.

SPECIFICATION forming part of Letters Patent No. 769,945, dated September 13, 1904.

Application filed November 18, 1902. Serial No. 131,847. (No model.)

*To all whom it may concern:*

Be it known that I, CHAUNCEY W. HOWLAND, of Geneva, in the county of Ontario, in the State of New York, have invented new and useful Improvements in Machines for Truing Rotary Grindstones, of which the following, taken in connection with the accompanying drawings, is a full, clear, and exact description.

This invention relates to an improved machine for truing rotary grindstones such as are generally used for grinding lenses to the desired form and size. The process of forming and sizing these lenses is necessarily a delicate and painstaking one and requires that the lenses be held between suitable clamping-heads by friction alone, and the pressure of contact of the lenses with the grindstone must, therefore, be light and substantially uniform to prevent displacement of the lenses with reference to their clamping-heads. This requirement implies that in order to grind the edges of the lens accurately, uniformly, and expeditiously the grinding-surface of the stone must be maintained in a perfectly smooth and even condition, with all points practically parallel with and equidistant from the axis of revolution of the stone.

My object, therefore, is to provide a simple and practical machine which may be operated manually to accomplish these results in the most efficient and expeditious manner practicable.

In the drawings, Figure 1 is a top plan of a machine for carrying out this object. Figs. 2 and 3 are sectional views taken, respectively, on lines 2 2 and 3 3, Fig. 1.

Similar reference characters indicate corresponding parts in all the views.

This machine consists, essentially, of a bed-plate 1, sliding heads or blocks 2 and 3, movable in planes at substantially right angles to each other, an abrasive member 4, movable toward and from and across the face of the grindstone, as $a$, and separate operating mechanisms 5 and 6 for moving the sliding heads. The bed-plate 1 forms the main support for the remaining parts of the machine and may, if desired, be a portion of the grindstone-frame, but in this instance consists of a separate block of metal adapted to be clamped to the grindstone-frame and is provided with a lengthwise rib 7, rising from its upper face and preferably dovetail in cross-section to form a suitable guide for the superimposed sliding head or block 2, and is also formed with a lengthwise-projecting arm 8, to which the operating member 5 is attached. The guide-rib 7 is arranged parallel with the axis of revolution of the grindstone, and the sliding head or block 2 is mounted upon and movable along this rib, the lower face of the head 2 being formed with a dovetail groove 9, which receives and fits the rib 7, so as to permit longitudinal movement of the head 2 across the face of the stone and at the same time prevent its removal except at the ends of the rib 7. This head 2 is also preferably formed of metal and of less width than the length of the rib 7 and is provided with a transverse dovetail guide-rib 10, projecting centrally from the upper face to receive and guide the head-block 3 toward and from the face of the stone, said rib 10 being disposed at substantially right angles to the rib 7 and is formed with a central recess 11 in its upper face, terminating at one end in a threaded aperture 12 to receive one end of the operating member 6, which in this instance consists of a hand-screw.

In order that the heads 2 and 3 may be moved freely along their respective guide-ribs 7 and 10 and still be held from lateral movement with reference to said guides, I provide suitable gibs 13 and adjusting-screws 14, by which any wear may be readily taken up.

The abrasive member 4 is mounted centrally upon the upper face of the sliding block 3 and preferably consists of a bar of carborundum or equivalent material, which is held in position by a clamping-plate 15 and suitable clamping-bolts 16, the plate 15 being engaged with the upper face of the member 4, and the bolts 16 are disposed at the opposite edges of said member and enter threaded apertures in the sliding block 3, whereby the plate 15 and bar 4 are firmly clamped to the block 3 and move with said block toward and from and across the face of the grindstone.

The means for moving the sliding block 2 and the parts carried thereby across the face of the stone preferably consists of the hand-lever 5 and a link 17, the lever 5 being fulcrumed at 18 to the arm 8, and the link 17 connects the intermediate portion of said lever to one end of the sliding head or block 2, whereby as the lever is rocked horizontally on its fulcrum the block 2 is reciprocated along the bed-plate 1 and across the face of the stone.

The outer end of the hand-screw 6 is journaled in a suitable bearing 19, which is secured to the outer end face of the head-block 3, and its inner threaded end being engaged with the threaded aperture 12 it is evident that the rotation of the screw serves to move the head-block 3 toward and from the grinding-face of the stone or at right angles to the movement of the sliding block 2.

It is apparent from the foregoing description that when the abrasive member 4 is clamped in position with its inner end projecting beyond the inner faces of the remaining parts of the machine the cutting end of said member may be adjusted and held in the desired position by the screw 6 for trimming the periphery of the stone to an exact circle and that by operating the hand-lever 5 the abrasive member is moved across the face of the stone and trims it in a plane parallel with its axis of rotation, (indicated by the line $x$.) It is also evident that by loosening the screws 16 the abrasive member 4 may be adjusted to the stone when necessary independently of the screw 6, this latter adjustment being inoperative to take up the wear of said member and to give the necessary clearance between the periphery of the stone and the adjacent parts of the machine.

Having thus described my invention, what I claim, and desire to secure by Letters Patent, is—

1. In a machine of the type set forth, a horizontal bed-plate having a projecting arm on one of its forward corners, a lower head slidingly mounted on said bed-plate, an upper sliding head mounted on said lower one, said lower head having a threaded aperture therein, a bearing depending from the upper head, a screw passing through said bearing and into said aperture, a clamping-plate on the upper head to retain the work-tool between its under face and the upper head, and a series of bolts passing through said plate and into the upper head, and means connected to said arm and said lower head to operate the latter.

2. In a machine for truing grindstones, a bed-plate having a guide-rib on its upper face, and provided at one end with an arm, a lower head fitted to slide on the guide-rib of the bed-plate, guide-ribs on said lower head, a lever fulcrumed to the arm carried by said bed-plate, and a link pivoted to said lever and to the said lower head, an upper head fitted to slide on the guide-ribs of the lower head, means for holding the upper head against lateral movement on said guide-ribs of the lower head, an abrasive member secured by a clamp to the upper face of the upper head, and an adjusting-screw carried by the upper head and working in the lower head to move the upper head longitudinally on the guide-ribs, substantially as described.

In witness whereof I have hereunto set my hand this 8th day of November, 1902.

CHAUNCEY W. HOWLAND.

Witnesses:
F. S. BRONSON,
L. W. KEYES.